(12) United States Patent
Yang et al.

(10) Patent No.: US 11,265,162 B2
(45) Date of Patent: Mar. 1, 2022

(54) SYSTEM AND METHOD FOR PROVIDING PRIVACY AND SECURITY PROTECTION IN BLOCKCHAIN-BASED PRIVATE TRANSACTIONS

(71) Applicant: ALIPAY (HANGZHOU) INFORMATION TECHNOLOGY CO., LTD., Zhejiang (CN)

(72) Inventors: Dayi Yang, Hangzhou (CN); Ning Xia, Hangzhou (CN); Kang Li, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/341,806

(22) Filed: Jun. 8, 2021

(65) Prior Publication Data

US 2021/0297251 A1    Sep. 23, 2021

Related U.S. Application Data

(63) Continuation of application No. PCT/CN2020/100190, filed on Jul. 3, 2020.

(51) Int. Cl.
*H04L 29/06* (2006.01)
*H04L 9/30* (2006.01)
*H04L 9/32* (2006.01)

(52) U.S. Cl.
CPC .............. *H04L 9/30* (2013.01); *H04L 9/3247* (2013.01)

(58) Field of Classification Search
CPC ................................ H04L 9/30; H04L 9/3247
See application file for complete search history.

(56) References Cited

U.S. PATENT DOCUMENTS 11,080,694 B2 * 8/2021 Ma .................. G06Q 20/389
2016/0321654 A1   11/2016 Lesavich et al.
(Continued)

FOREIGN PATENT DOCUMENTS

CN      109815289 A    5/2019
EP        3542514 B1   2/2021
(Continued)

OTHER PUBLICATIONS

Written Opinion and International Search Report for PCT Application No. PCT/CN2020/100190 dated Apr. 1, 2021.
(Continued)

*Primary Examiner* — Ghodrat Jamshidi

(57) ABSTRACT

Methods, systems, and apparatus, including computer programs encoded on computer storage media, for implementing blockchain-based private transactions are provided. One of the methods includes transmitting, at a first blockchain node of a number (N) of blockchain nodes that are involved in a private transaction, the private transaction to each of a plurality of second blockchain nodes of the N blockchain nodes, wherein N is at least four, at least (N–F) signatures certifying the private transaction respectively from at least (N–F) blockchain nodes of the first and second blockchain nodes, wherein F is a largest integer no more than (N–1)/2; and submitting, at the first blockchain node, a hash value of the private transaction in association with the at least (N–F) signatures to one or more blockchain nodes of a public blockchain for adding into the public blockchain.

16 Claims, 6 Drawing Sheets

(56) References Cited

U.S. PATENT DOCUMENTS

| | | |
|---|---|---|
| 2018/0019879 A1 | 1/2018 | Kravitz et al. |
| 2018/0117447 A1 | 5/2018 | Tran et al. |
| 2018/0137512 A1 | 5/2018 | Georgiadis et al. |
| 2018/0183586 A1 | 6/2018 | Bhargav-spantzel et al. |
| 2018/0183587 A1 | 6/2018 | Won et al. |
| 2018/0183768 A1 | 6/2018 | Lobban et al. |
| 2019/0026146 A1 | 1/2019 | Peffers et al. |
| 2019/0163912 A1 | 5/2019 | Kumar et al. |
| 2019/0164153 A1 | 5/2019 | Agrawal et al. |
| 2019/0166116 A1 | 5/2019 | Kumar et al. |
| 2019/0251199 A1 | 8/2019 | Klianev |
| 2019/0268407 A1 | 8/2019 | Zeng et al. |
| 2019/0288993 A1* | 9/2019 | Lin ................. G06Q 20/02 |
| 2019/0306125 A1 | 10/2019 | Efremov et al. |
| 2019/0354977 A1* | 11/2019 | Tang ................. G06F 21/62 |
| 2019/0358515 A1 | 11/2019 | Tran et al. |
| 2019/0386969 A1 | 12/2019 | Verzun et al. |
| 2020/0101367 A1 | 4/2020 | Tran et al. |
| 2020/0396060 A1* | 12/2020 | Wu ................. G06Q 20/02 |
| 2020/0403776 A1* | 12/2020 | Oh ................. H04L 9/3239 |
| 2020/0412820 A1* | 12/2020 | Assadipour ........... H04L 67/104 |
| 2021/0097532 A1* | 4/2021 | Mahasuverachai ..... G06F 21/64 |
| 2021/0126797 A1* | 4/2021 | Peng ................. H04L 63/123 |
| 2021/0165890 A1* | 6/2021 | Schvey ................. H04L 9/3297 |
| 2021/0273818 A1* | 9/2021 | Zhu ................. G06Q 40/04 |

FOREIGN PATENT DOCUMENTS

| | | |
|---|---|---|
| WO | 2019072263 A2 | 4/2019 |
| WO | 2019170167 A2 | 9/2019 |

OTHER PUBLICATIONS

Extended European Search Report for European Application No. 20 897 640.7 dated Dec. 8, 2021.

* cited by examiner

510

511: transmitting, at a first blockchain node of a number (N) of blockchain nodes that are involved in a private transaction, the private transaction to each of a plurality of second blockchain nodes of the N blockchain nodes, wherein N is at least four

512: obtaining, at the first blockchain node, at least (N-F) signatures certifying the private transaction respectively from at least (N-F) blockchain nodes of the first and second blockchain nodes, wherein F is a largest integer no more than (N-1)/2

513: submitting, at the first blockchain node, a hash value of the private transaction in association with the at least (N-F) signatures to one or more blockchain nodes of a public blockchain for adding into the public blockchain

FIG.5

SYSTEM AND METHOD FOR PROVIDING PRIVACY AND SECURITY PROTECTION IN BLOCKCHAIN-BASED PRIVATE TRANSACTIONS

CROSS REFERENCE TO RELATED APPLICATION

This application is a continuation application of International Application No. PCT/CN2020/100190, filed on Jul. 3, 2020, the contents of which are incorporated by reference in the entirety.

TECHNICAL FIELD

This application generally relates to methods and devices for providing privacy and security protection for blockchain-based private transactions.

BACKGROUND

Blockchain provides data storage in a decentralized fashion, by keeping the data in a series of data blocks having precedence relationships between each other. The chain of blocks is maintained and updated by a network of nodes, which are also responsible for validating the data. The stored data may involve transactions among various parties, and the blockchain storing the data may be also referred to as a shared ledger that keeps track of these transactions.

A valid transaction usually comprises elements such as the sender (e.g., sender account address), receiver (e.g., receiver account address), and transaction amount. In traditional blockchain systems, to prevent double-spending and other fraudulent activities, these elements are explicitly made public for verification, and such transactions are known as public transactions. Without privacy protection, these public transactions are broadcast to all blockchain nodes for them to verify and execute.

Private transactions on the other hand need to hide one or more elements from non-participating parties. One existing proposal for offering privacy protection is the Quorum private transaction. In a private transaction among an initiating party and one or more participating parties, for each participating party, the sender party needs to encrypt the transaction with a symmetric key, encrypt the symmetric key with a public key of the participating party, send both encryptions to the participating party. The initiating party and participating parties conduct the private transaction through their corresponding blockchain nodes. Then, the hash of the transaction may be consensus-verified by the blockchain nodes and packed into the blockchain.

Another existing proposal for offering privacy protection is the Fabric private transaction. For a private transaction among an initiating party and one or more participating parties, the participating parties are specified through chaincode. Transaction hashes of private transactions ordered by orderer nodes are recorded on a public ledger, while transaction information of the private transactions are stored in endorsing peer nodes. The initiating party and participating parties can push private transaction information to or pull private transaction information from the endorsing peer nodes for executing the private transaction.

Existing blockchain technologies often centralize control of private transactions in a few special-purpose nodes (e.g., the initiating party's corresponding node in Quorum or the endorsing peer nodes in Fabric), and rely on the assumption that the special-purpose nodes are functioning. If the special-purpose nodes act maliciously and do not inform all participating parties of the private transaction or otherwise become non-functioning, the uninformed participating parties may be prevented from conducting further transactions due to missing transaction information of the private transaction. The missing information may conflict with the representation of the private transaction recorded to the public ledger, which may indicate the completion of the private transaction involving the uninformed participating parties. Thus, for parties that wish to conduct private transactions, it is desirable to provide a blockchain-based mechanism that allows privacy-protected transactions with adequate security protection.

SUMMARY

Various embodiments of the specification include, but are not limited to, systems, methods, and non-transitory computer-readable media for implementing blockchain-based private transactions.

According to some embodiments, a computer-implemented method for atomic broadcast comprises: transmitting, by a first blockchain computer node of a number (N) of blockchain computer nodes of a blockchain, data to each of a plurality of second blockchain computer nodes of the N blockchain computer nodes, wherein N is at least four; obtaining, by the first blockchain computer node, at least (N−F) signatures certifying the data respectively, wherein the at least (N−F) signatures respectively correspond to at least (N−F) blockchain computer nodes among the first and second blockchain computer nodes, wherein F is a largest integer that is not greater than (N−1)/2; generating, by the first blockchain computer node, a hash value of the data; associating, by the first blockchain computer node, the hash value with the at least (N−F) signatures; and submitting, by the first blockchain computer node, the hash value and the at least (N−F) signatures in association with each other to one or more blockchain computer nodes of the blockchain for adding into the blockchain based on a consensus verification of the hash value and the at least (N−F) signatures.

According to some embodiments, transmitting the data to each of the plurality of second blockchain computer nodes comprises: encrypting the data with a plurality of public keys respectively corresponding to the plurality of second blockchain computer nodes to obtain a plurality of pieces of encrypted data; and transmitting the plurality of pieces of encrypted data to the plurality of second blockchain computer nodes, respectively.

According to some embodiments, the at least (N−F) signatures certifying the data comprises: (N−F) signatures certifying receipt of the data and validity of the data.

According to some embodiments, each of the (N−F) signatures comprises: an encryption of the data with a private key corresponding to one of the at least (N−F) blockchain computer nodes.

According to some embodiments, obtaining the at least (N−F) signatures comprises: obtaining at least (N−F) consistent and valid signatures respectively from (N−F) distinct blockchain computer nodes of the N blockchain computer nodes.

According to some embodiments, the at least (N−F) signatures are respectively obtained from the plurality of second blockchain computer nodes.

According to some embodiments, one of the at least (N−F) signatures is obtained from the first blockchain computer node; and the other at least (N−F−1) signatures are respectively obtained from the plurality of second blockchain computer nodes.

According to some embodiments, submitting the hash value and the at least (N−F) signatures to the one or more blockchain computer nodes of the blockchain comprises: generating a blockchain transaction comprising the hash value and the at least (N−F) signatures; and transmitting the blockchain transaction to the one or more blockchain computer nodes of the blockchain for adding into the blockchain.

According to some embodiments, the generated blockchain transaction further comprises a group identification corresponding to the N blockchain computer nodes; and the group identification, when stored into the blockchain, identifies the N blockchain computer nodes.

According to some embodiments, the method further comprises: obtaining, by the first blockchain computer node, the blockchain transaction from the blockchain; and verifying, by the first blockchain computer node, the data by verifying if a number of signatures comprised in the obtained blockchain transaction reaches (N−F).

According to some embodiments, the method further comprises: locally executing, by the first blockchain computer node, the data according to an order of the blockchain transaction stored in the blockchain relative to other blockchain transactions stored in the blockchain.

According to some embodiments, the method further comprises: receiving, by the first blockchain computer node, a synchronization request from a requesting blockchain computer node; determining, by the first blockchain computer node, if the requesting blockchain computer node is one of the N blockchain computer nodes; and in response to determining that the requesting blockchain computer node is one of the N blockchain computer nodes, transmitting, by the first blockchain computer node, the data to the requesting blockchain computer node via a non-blockchain computer network channel.

According to some embodiments, the requesting blockchain computer node is one of F non-functioning blockchain computer nodes of the N blockchain computer nodes.

According to some embodiments, the blockchain is a public blockchain; and the data comprises one or more identifications of one or more senders of a private transaction, one or more identifications of one or more recipients of the private transaction, and one or more transaction amounts of the private transaction.

According to some embodiments, a non-transitory computer-readable storage medium of a first blockchain computer node stores instructions that, when executed by a processor, cause the processor to perform operations comprising: transmitting data to each of a plurality of second blockchain computer nodes of a number (N) of blockchain computer nodes of a blockchain, wherein N is at least four; obtaining at least (N−F) signatures certifying the data respectively, wherein the at least (N−F) signatures respectively correspond to at least (N−F) blockchain computer nodes among the first and second blockchain computer nodes, wherein F is a largest integer that is not greater than (N−1)/2; generating a hash value of the data; associating the hash value with the at least (N−F) signatures; and submitting the hash value and the at least (N−F) signatures in association with each other to one or more blockchain computer nodes of the blockchain for adding into the blockchain based on a consensus verification of the hash value and the at least (N−F) signatures.

A system acting as a first blockchain computer node includes one or more processors and one or more memories configured with instructions that, when executed by the one or more processors, cause system to perform operations comprising: transmitting data to each of a plurality of second blockchain computer nodes of a number (N) of blockchain computer nodes of a blockchain, wherein N is at least four; obtaining at least (N−F) signatures certifying the data respectively, wherein the at least (N−F) signatures respectively correspond to at least (N−F) blockchain computer nodes among the first and second blockchain computer nodes, wherein F is a largest integer that is not greater than (N−1)/2; generating a hash value of the data; associating the hash value with the at least (N−F) signatures; and submitting the hash value and the at least (N−F) signatures in association with each other to one or more blockchain computer nodes of the blockchain for adding into the blockchain based on a consensus verification of the hash value and the at least (N−F) signatures.

According to some embodiments, a computer-implemented method for implementing blockchain-based private transactions includes transmitting, at a first blockchain node of a number (N) of blockchain nodes that are involved in a private transaction, the private transaction to each of a plurality of second blockchain nodes of the N blockchain nodes, wherein N is at least four; obtaining, at the first blockchain node, at least (N−F) signatures certifying the private transaction respectively from at least (N−F) blockchain nodes of the first and second blockchain nodes, wherein F is a largest integer no more than (N−1)/2; and submitting, at the first blockchain node, a hash value of the private transaction in association with the at least (N−F) signatures to one or more blockchain nodes of a public blockchain for adding into the public blockchain.

According to other embodiments, the private transaction comprises transaction information comprising one or more senders of the private transaction, one or more recipients of the private transaction, and one or more transaction amounts of the private transaction.

According to yet other embodiments, the method is performed according to an atomic broadcast protocol.

According to still other embodiments, transmitting the private transaction to each of the plurality of second blockchain nodes comprises: respectively encrypting the private transaction with a plurality of public keys respectively corresponding to the plurality of second blockchain nodes; and respectively transmitting the encrypted private transactions to the plurality of second blockchain nodes.

According to some embodiments, certifying the private transaction comprises certifying receipt of the private transaction and validity of the private transaction.

According to other embodiments, the signature comprises an encryption of the private transaction with a private key corresponding to the first or second blockchain node.

According to yet other embodiments, obtaining the at least (N−F) signatures comprises obtaining at least (N−F) consistent and valid signatures respectively from (N−F) distinct blockchain nodes of the N blockchain nodes.

According to still other embodiments, one of the (N−F) signatures is from the first blockchain node, and the other (N−F−1) signatures are respectively from the plurality of second blockchain nodes.

According to some embodiments, submitting the hash value of the private transaction in association with the at least (N−F) signatures to the one or more blockchain nodes of the public blockchain for adding into the public blockchain comprises transmitting a blockchain transaction comprising a transaction hash of the private transaction, the at least (N−F) signatures, and a group identification corresponding to the N blockchain nodes to the one or more blockchain nodes of the public blockchain for adding into the public blockchain, wherein the group identification, when stored into the public blockchain, serves as a notification to the N blockchain nodes of a successful consensus verification of the private transaction.

According to other embodiments, the method further comprises obtaining, at the first blockchain node, the private transaction from the public blockchain; and verifying, at the first blockchain node, the private transaction by verifying if a number of signatures comprised in the obtained private transaction reaches at least (N−F).

According to yet other embodiments, the method further comprises locally executing, at the first blockchain node, the private transaction according to an order of the private transaction stored in the public blockchain relative to other private and public transactions stored in the public blockchain.

According to still other embodiments, the method further comprises: receiving, at the first blockchain node, a synchronization request from a requesting blockchain node; determining, at the first blockchain node, if the requesting blockchain node is one of the N blockchain nodes; and in response to determining that the requesting blockchain node is one of the N blockchain nodes, transmitting, at the first blockchain node, the private transaction to the requesting blockchain node via a non-blockchain channel.

According to some embodiments, the requesting blockchain node is one of F non-functioning blockchain nodes of the N blockchain nodes.

According to still other embodiments, a system for implementing blockchain-based private transactions comprising: one or more processors; and one or more computer-readable memories coupled to the one or more processors and having instructions stored thereon that are executable by the one or more processors to perform the method of any of the preceding embodiments.

According to some embodiments, an apparatus for implementing blockchain-based private transactions comprises a plurality of modules for performing the method of any of the preceding embodiments.

According to some embodiments, a non-transitory computer-readable medium has stored therein instructions that, when executed by a processor of a device, cause the device to perform the method of any of the preceding embodiments.

According to other embodiments, a system for implementing blockchain-based private transactions comprises one or more processors and one or more non-transitory computer-readable memories coupled to the one or more processors and configured with instructions executable by the one or more processors to cause the system to perform operations. The operations may comprise: includes transmitting, at a first blockchain node of a number (N) of blockchain nodes that are involved in a private transaction, the private transaction to each of a plurality of second blockchain nodes of the N blockchain nodes, wherein N is at least four; obtaining, at the first blockchain node, at least (N−F) signatures certifying the private transaction respectively from at least (N−F) blockchain nodes of the first and second blockchain nodes, wherein F is a largest integer no more than (N−1)/2; and submitting, at the first blockchain node, a hash value of the private transaction in association with the at least (N−F) signatures to one or more blockchain nodes of a public blockchain for adding into the public blockchain.

According to yet other embodiments, a non-transitory computer-readable storage medium for implementing blockchain-based private transactions is configured with instructions executable by one or more processors to cause the one or more processors to perform operations. The operations may comprise: includes transmitting, at a first blockchain node of a number (N) of blockchain nodes that are involved in a private transaction, the private transaction to each of a plurality of second blockchain nodes of the N blockchain nodes, wherein N is at least four; obtaining, at the first blockchain node, at least (N−F) signatures certifying the private transaction respectively from at least (N−F) blockchain nodes of the first and second blockchain nodes, wherein F is a largest integer no more than (N−1)/2; and submitting, at the first blockchain node, a hash value of the private transaction in association with the at least (N−F) signatures to one or more blockchain nodes of a public blockchain for adding into the public blockchain.

According to still other embodiments, an apparatus for implementing blockchain-based private transactions is associated with a first blockchain node to a private transaction between/among a number (N) of blockchain nodes. The apparatus includes: a transmitting module for transmitting the private transaction to each of a plurality of second blockchain nodes of the N blockchain nodes, wherein N is at least four; an obtaining module for obtaining at least (N−F) signatures certifying the private transaction respectively from at least (N−F) blockchain nodes of the first and second blockchain nodes, wherein F is a largest integer no more than (N−1)/2; and a submitting module for submitting a hash value of the private transaction in association with the at least (N−F) signatures to one or more blockchain nodes of a public blockchain for adding into the public blockchain.

Embodiments disclosed in the specification have one or more technical effects. In some embodiments, private transaction delivery and receiving protocols are disclosed. Blockchain nodes of various parties to a private transaction may follow the delivery and receiving protocols to conduct the private transaction for privacy and safety protection. In other embodiments, the private transaction delivery and receiving protocols satisfy atomic broadcast protocols which have the following properties: uniform agreement, validity, and uniform total order. In some embodiments, a representation of a private transaction is recorded to a public blockchain to ensure public notification and recognition of the occurrence of the private transaction, while transaction information of the private transaction is kept from the public blockchain to offer privacy protection. In one embodiment, transaction information (e.g., details such as sender, receiver, and transaction amount) of the private transaction are transmitted among and accessible to parties to the private transaction or their blockchain nodes and kept from parties or their blockchain nodes that are not involved in the private transaction. In another embodiment, the validity of the private transaction can be verified by nodes of the public blockchain. Double-spending and other fraud can be prevented. In yet another embodiment, blockchain nodes of all parties conducting the private transaction are all informed and thus synchronized to the same state. In still another embodiment, a method is provided for conveniently and safely creating and managing such private transactions. In other embodiments, acknowledgment (e.g., in terms of signatures) of more than a threshold percentage of blockchain nodes of participating parties to the private transaction is required to be collected and stored to the public blockchain, preempting malicious acts by the initiating party to the private transaction. In yet other embodiments, according to group assignment, the parties involved in the private transaction can identify other parties to the private transaction, obtain their public keys to verify their signatures, and be notified of the occurrence of the private transaction when a transaction hash of the private transaction is packed into the public blockchain. Thus, the security and privacy protection of private transactions are improved.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

BRIEF DESCRIPTION OF THE DRAWINGS

FIG. 5 illustrates a flowchart of a method for implementing blockchain-based private transactions, in accordance with some embodiments.

DETAILED DESCRIPTION

Figure 1:
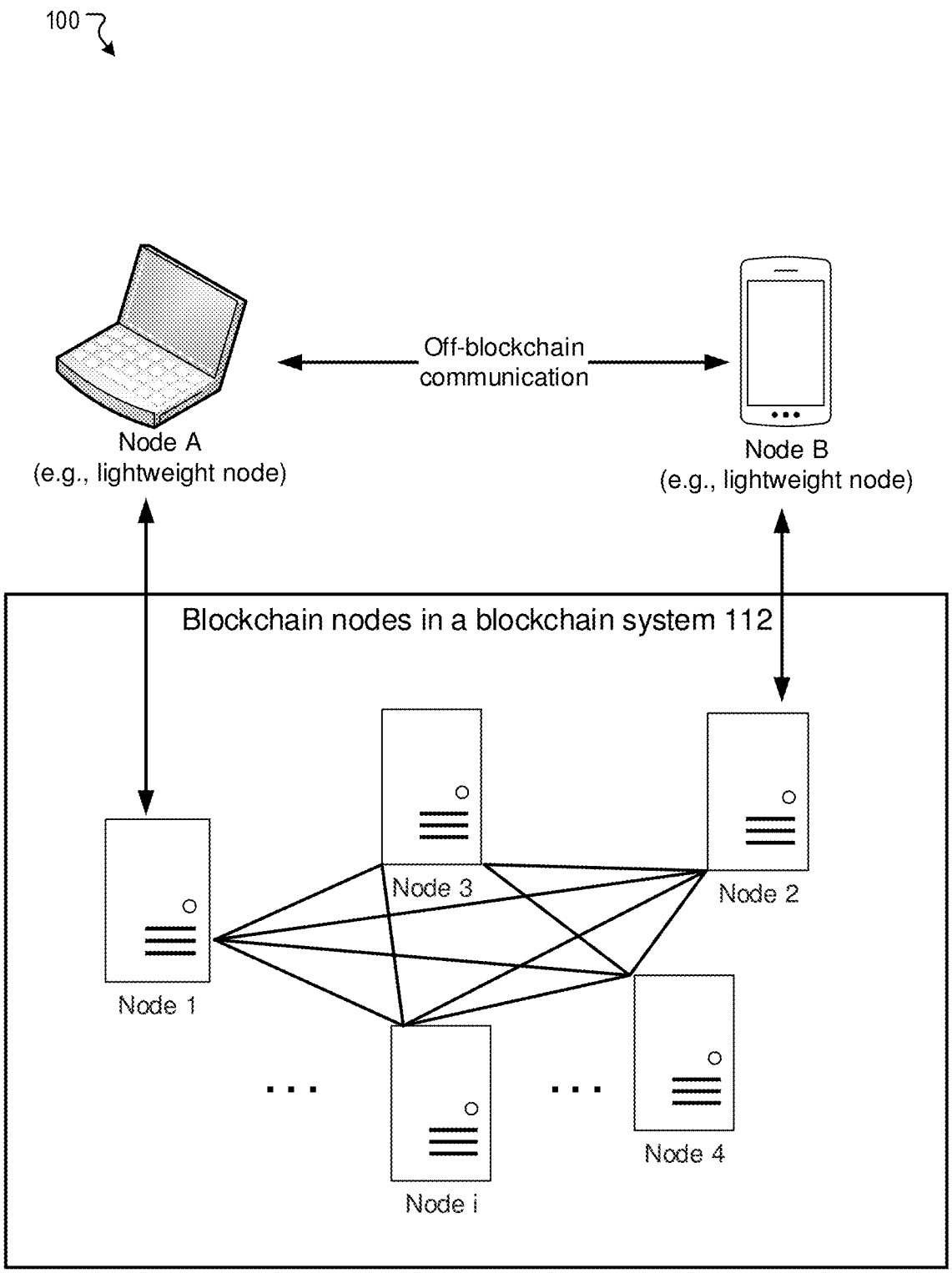
FIG. 1 illustrates a system for implementing blockchain-based private transactions, in accordance with some embodiments.

FIG. 1 shows an example of a blockchain network 100, in accordance with some embodiments. As shown, the blockchain network 100 may comprise one or more client devices (e.g., Node A, Node B, etc.) coupled to a blockchain system 112. The client devices may include lightweight nodes. A lightweight node may not download the complete blockchain, but may instead just download the block headers to validate the authenticity of the blockchain transactions. Lightweight nodes may be served by and effectively dependent on full nodes (e.g., those in the blockchain system 112) to access more functions of the blockchain. The lightweight nodes may be implemented in electronic devices such as laptops, mobile phones, and the like by installing an appropriate software.

The blockchain system 112 may comprise a plurality of blockchain nodes (e.g., Node 1, Node 2, Node 3, Node 4, Node i, etc.), which may include full nodes. Full nodes may download every block and blockchain transaction and check them against the blockchain's consensus rules. The blockchain nodes may form a network (e.g., peer-to-peer network) with one blockchain node communicating with another. The order and the number of the blockchain nodes as shown are merely examples and for the simplicity of illustration. The blockchain nodes may be implemented in servers, computers, etc. For example, the blockchain nodes may be implemented in a cluster of servers. The cluster of servers may employ load balancing. Each blockchain node may correspond to one or more physical hardware devices or virtual devices coupled together via various types of communication methods such as TCP/IP. Depending on the classifications, the blockchain nodes may also be referred to as full nodes, Geth nodes, consensus nodes, etc.

Each of the client devices and blockchain nodes may be installed with appropriate software (e.g., application program interface) and/or hardware (e.g., wires, wireless connections) to access other devices of the blockchain network 100. In general, the client devices and blockchain nodes may be able to communicate with one another through one or more wired or wireless networks (e.g., the Internet) through which data can be communicated. Each of the client devices and blockchain nodes may include one or more processors and one or more memories coupled to the one or more processors. The memories may be non-transitory and computer-readable and be configured with instructions executable by one or more processors to cause the one or more processors to perform operations described herein. The instructions may be stored in the memories or downloaded over a communications network without necessarily being stored in the memories. Although the client devices and blockchain nodes are shown as separate components in this figure, it will be appreciated that these systems and devices can be implemented as single devices or multiple devices coupled together. That is, a client device (e.g., Node A) may be alternatively integrated into a blockchain node (e.g., Node 1).

The client devices such as Node A and Node B may be installed with an appropriate blockchain software to initiate, forward, or access blockchain transactions. Node A may access the blockchain through communications with Node 1 or one or more other blockchain nodes, and Node B may access the blockchain through communications with Node 2 or one or more other blockchain nodes. Off the blockchain, Node A and Node B may have other channels of communication (e.g., regular internet communication without going through Node 1 and Node 2). In some embodiments, Node A may submit a blockchain transaction to the blockchain through Node 1 or similar nodes to request adding the blockchain transaction to the blockchain.

In one embodiment, the submitted blockchain transaction may comprise a financial transaction between various parties. In another embodiment, the submitted blockchain transaction may comprise a data update event that updates the data store. For example, the submitted blockchain transaction may comprise a blockchain contract (e.g., smart contract) for deployment on the blockchain. For another example, the submitted blockchain transaction may comprise a request to invoke a deployed blockchain contract. In this specification, the term "blockchain transaction" may be implemented via a blockchain system and recorded to the blockchain. The blockchain transaction may include, for example, a financial transaction, a blockchain contract transaction for deploying or invoking a blockchain contract, a blockchain transaction that updates a state (e.g., world state) of the blockchain, etc. The blockchain transaction does not have to involve a financial exchange. The financial transaction may be blockchain-based and may be a private or public transaction. Thus, private transactions, public transactions, and related terms (such as transaction amounts, transaction information, etc.) may refer to corresponding financial transactions.

The blockchain contracts (or referred to as smart contracts) may include contractual terms between users written in lines of code. The blockchain contract may be a computer protocol intended to digitally facilitate, verify, or enforce the negotiation or performance of a contract. In some embodiments, to handle the blockchain contracts, each node of the blockchain network runs a corresponding virtual machine (VM) and executes the same instructions. A VM is a software emulation of a computer system based on computer architectures and provides the functionality of a physical computer. VM in the blockchain context can be understood as a system designed to operate as a runtime environment for blockchain contracts.

The blockchain may be maintained by the blockchain nodes each comprising or coupling to a memory. In some embodiments, the memory may store a pool database. The pool database may be accessible to the plurality of blockchain nodes in a distributed manner For example, the pool database may be respectively stored in the memories of the blockchain nodes. The pool database may store a plurality of blockchain transactions submitted by the one or more client devices similar to Node A.

In some embodiments, after receiving a blockchain transaction request of an unconfirmed blockchain transaction, the recipient blockchain node may perform some preliminary verification of the blockchain transaction. For example, Node 1 may perform the preliminary verification after receiving the blockchain transaction from Node A. Once verified, the blockchain transaction may be stored in the pool database of the recipient blockchain node (e.g., Node 1), which may also forward the blockchain transaction to one or more other blockchain nodes (e.g., Node 3, Node 4). The one or more other blockchain nodes may repeat the process done by the recipient node.

Once the blockchain transactions in the corresponding pool database reach a certain level (e.g., a threshold amount), the blockchain nodes may each verify the batch of blockchain transactions in the corresponding pool database according to consensus rules or other rules. If the blockchain transaction involves a blockchain contract (e.g., smart contract), the blockchain node may execute the blockchain contract locally. The blockchain contract may include user-written contract code. An example of a blockchain transaction may encode data in contract code for data storage (by contract deployment) and retrieval (by accessing or executing contract).

A certain blockchain node that successfully verifies its batch of blockchain transactions in accordance with consensus rules may pack the blockchain transactions into its local copy of the blockchain and multicast the results to other blockchain nodes. The certain blockchain node may be a blockchain node that has first successfully completed the verification, that has obtained the verification privilege, or that has been determined based on another consensus rule, etc. Then, the other blockchain nodes may execute the blockchain transactions locally, verify the execution results with one another (e.g., by performing hash calculations), and synchronize their copies of the blockchain with that of the certain blockchain node. By updating their local copies of the blockchain, the other blockchain nodes may similarly write such information in the blockchain transaction into respective local memories. As such, the blockchain contract can be deployed on the blockchain. If the verification fails at some point, the blockchain transaction is rejected.

The deployed blockchain contract may have an address, according to which the deployed contract can be accessed. A blockchain node may invoke the deployed blockchain contract by inputting certain parameters to the blockchain contract. In one embodiment, Node B may request to invoke the deployed blockchain contract to perform various operations. For example, data stored in the deployed blockchain contract may be retrieved. For another example, data may be added to the deployed blockchain contract. For yet another example, a financial transaction specified in the deployed blockchain contract may be executed. Notwithstanding the above, other types of blockchain systems and associated consensus rules may be applied to the disclosed blockchain system.

In some embodiments, the blockchain system 112 comprises blockchain nodes maintaining a public blockchain. In one embodiment, a public transaction submitted to the blockchain system 112 for adding to the public blockchain is visible to all blockchain nodes for verification and execution. In another embodiment, a private transaction may only involve a number of the blockchain nodes representing the parties to the private transaction. For such private transaction, though a representation of the private transaction may still be submitted like the public transaction for adding to the public blockchain, transaction information of the private transaction may be kept away from non-participating parties and their blockchain nodes. In that case, the transaction information of the private transaction may be transmitted among a limited number of blockchain nodes (e.g., blockchain nodes of the parties to the private transaction). That is, unlike public transactions, a private transaction may keep at least a portion of its transaction information (e.g., the sender, receiver, and transaction information) known to parties of the transactions for these parties' corresponding blockchain nodes to verify and execute, without broadcasting to non-participating parties. The public blockchain as visible to all blockchain nodes may record proof of the private transaction such as a transaction hash of the private transaction and an encryption of the transaction information, but not explicitly storing at least the portion of the transaction information. The transaction hash is a hash value which may be the numeric result of applying a hash algorithm to the data of the transactions (e.g., transaction information). For example, a transaction hash of a private transaction between Node 1 and Node 2 may be recorded to a public blockchain and visible to Node 1, Node 2, Node 3, Node 4, and so on, while transaction information of the private transaction may be only known to Node 1 and Node 2. To that end, Node 1 and Node 2 may communicate off the blockchain and keep the transaction information of the private transaction private, or communicate on the blockchain but only allow visibility to certain nodes (e.g., through public-private key encryption).

Figure 2:
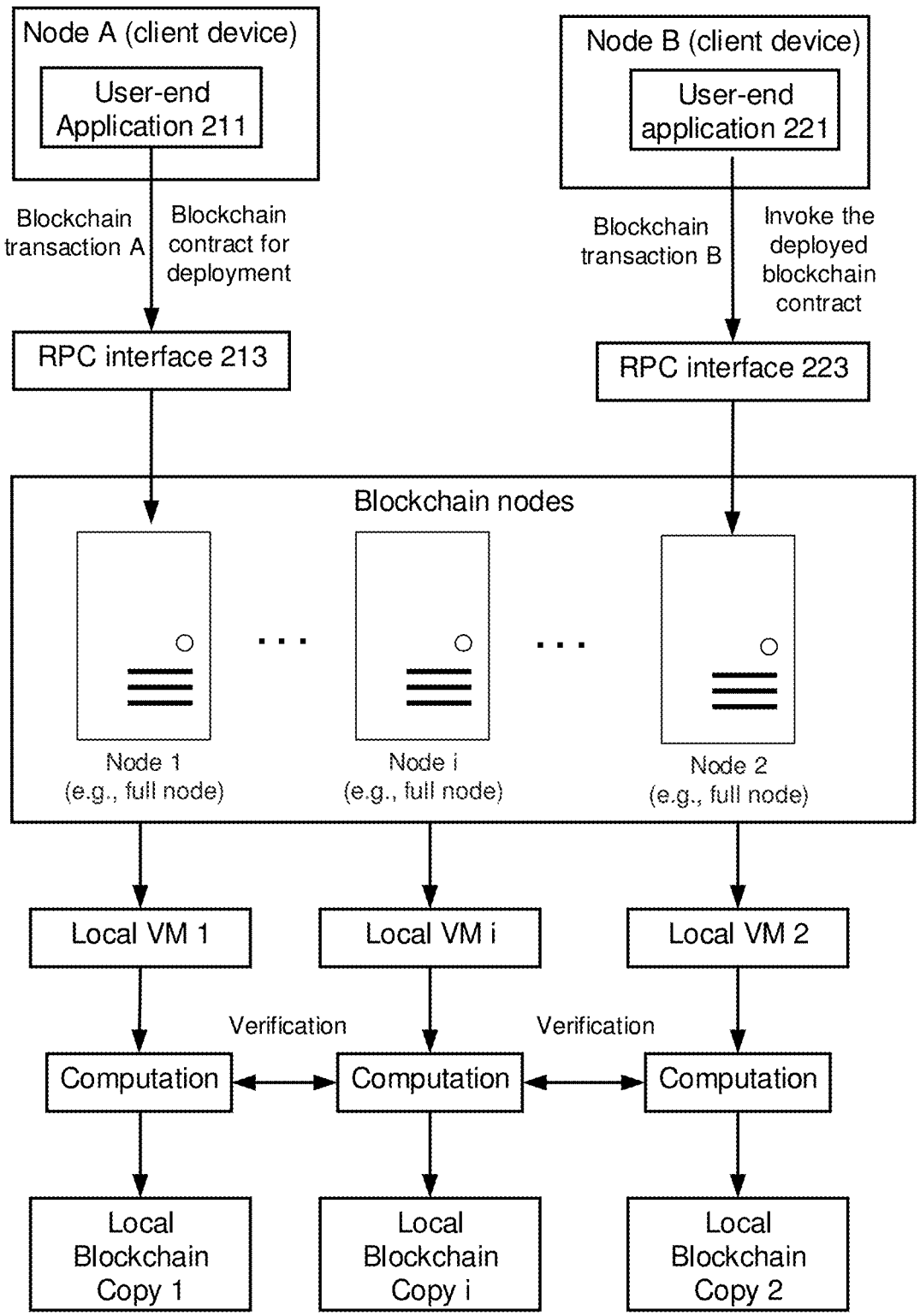
FIG. 2 illustrates a framework for implementing blockchain-based transactions, in accordance with some embodiments.

FIG. 2 illustrates a framework for implementing blockchain contracts, in accordance with some embodiments. The description with respect to FIG. 2 below will be directed to deploying and invoking a publicly accessible blockchain contract on a public blockchain. For example, information (e.g., on parties to a private transaction, a transaction hash of a private transaction) that needs to be publicly verifiable and stored based on consensus may be included in a blockchain contract for storing in a public blockchain.

In some embodiments, a blockchain contract may start with its construction in source code. For example, a user A may program a blockchain contract in source code and input the source code to an interface of a user-end application 211. In this figure, the user-end application 211 is installed in Node A. To deploy the blockchain contract, Node A may compile the blockchain contract source code using a corresponding compiler, which converts the source code into bytecode. After receiving the bytecode, the user-end application may generate a blockchain transaction A including the bytecode and submit the blockchain transaction A to one or more of the blockchain nodes. For example, the blockchain transaction A may comprise information such as nonce (e.g., transaction serial number), from (e.g., an address of user A's account), to (e.g., empty if deploying a blockchain contract), GasLimit (e.g., an upper limit of transaction fee consumed for the transaction), GasPrice (e.g., a transaction fee offered by the sender), value (e.g., transaction amount), data (e.g., the bytecode), etc. Node A may sign the blockchain transaction A with various encryption methods to represent endorsement by Node A. Node A may send the blockchain transaction A to a blockchain node (e.g., Node 1) through a remote procedure call (RPC) interface 213. RPC is a protocol that a first program (e.g., user-end application) can use to request a service from a second program located in another computer on a network (e.g., blockchain node) without having to understand the network's details. When the first program causes a procedure to execute in a different address space (e.g., on Node 1), it is as if a normal (local) procedure call, without the programmer explicitly coding the details for the remote interaction.

On receiving the blockchain transaction A, as described earlier, Node 1 may verify if the blockchain transaction A is valid. For example, the signature of Node A and other formats may be verified. If the verification succeeds, Node 1 may broadcast the blockchain transaction A to the blockchain network including various other blockchain nodes. Some blockchain nodes may participate in the mining process of the blockchain transactions. The blockchain transaction A may be picked by a certain node for consensus verification to pack into a new block. The certain node may create a contract account for the blockchain contract in association with a contract account address. The certain node may trigger its local VM to execute the blockchain contract, thereby deploying the blockchain contract to its local copy of the blockchain and updating the account states in the blockchain. If the certain node succeeds in mining the new block, the certain node may broadcast the new block to other blockchain nodes. The other blockchain nodes may verify the new block as mined by the certain blockchain node. If consensus is reached, the blockchain transaction A is respectively packed to the local copies of the blockchain maintained by the blockchain nodes. The blockchain nodes may similarly trigger their local VMs (e.g., local VM 1, local VM i, local VM 2) to execute the blockchain contract, thus invoking the blockchain contract deployed on the local copies of the blockchain (e.g., local blockchain copy 1, local blockchain copy i, local blockchain copy 2) and making corresponding updates. The hardware machine of each blockchain node may have access to one or more virtual machines, which may be a part of or couple to the corresponding blockchain node. Each time, a corresponding local VM may be triggered to execute the blockchain contract in the blockchain transaction A. Likewise, all other blockchain transactions in the new block will be executed. Lightweight nodes may also synchronize to the updated blockchain.

When a blockchain node would like to perform an operation (e.g., adding data, accepting an offer) to the deployed blockchain contract, the blockchain node may need to invoke the blockchain contract. In some embodiments, a user B may program an instruction to invoke a blockchain contract in source code and input the source code to an interface of a user-end application 221. To invoke the blockchain contract, Node B may compile the instruction using a corresponding compiler, which converts the source code into bytecode. After receiving the bytecode, the user-end application may generate a blockchain transaction B including the bytecode and submit the blockchain transaction B to one or more of the blockchain nodes. Similarly, the blockchain transaction B may comprise information such as nonce (e.g., transaction serial number), from (e.g., an address of user B's account), to (e.g., an address of the deployed blockchain contract), GasLimit (e.g., an upper limit of transaction fee consumed for the transaction), GasPrice (e.g., a transaction fee offered by the sender), value (e.g., transaction amount), data (e.g., the bytecode), etc. Node B may sign the blockchain transaction B with various encryption methods to represent endorsement by Node B. Node B may send the blockchain transaction B to a blockchain node (e.g., Node 2) through a remote procedure call (RPC) interface 223.

On receiving the blockchain transaction B, Node 2 may verify if the blockchain transaction B is valid. For example, the signature of Node B and other formats may be verified. If the verification succeeds, Node 2 may broadcast the blockchain transaction B to the blockchain network including various other blockchain nodes. The blockchain transaction B sent by Node B may be picked by a certain node for consensus verification to pack into a new block. The certain node may trigger its local VM to execute the blockchain contract, thereby invoking the blockchain contract deployed on its local copy of the blockchain and updating the account states in the blockchain. If the certain node succeeds in mining the new block, the certain node may broadcast the new block to other blockchain nodes. The other blockchain nodes may verify the new block as mined by the certain blockchain node. If consensus is reached, the blockchain transaction B is respectively packed to the local copies of the blockchain maintained by the blockchain nodes. The blockchain nodes may similarly trigger their local VMs to execute the blockchain contract, thus invoking the blockchain contract deployed on the local copies of the blockchain and making corresponding updates. The hardware machine of each blockchain node may have access to one or more virtual machines, which may be a part of or couple to the corresponding blockchain node. Each time, a corresponding local VM may be triggered to execute the blockchain contract in the blockchain transaction B. Likewise, all other blockchain transactions in the new block will be executed. Lightweight nodes may also synchronize to the updated blockchain.

Figure 3:
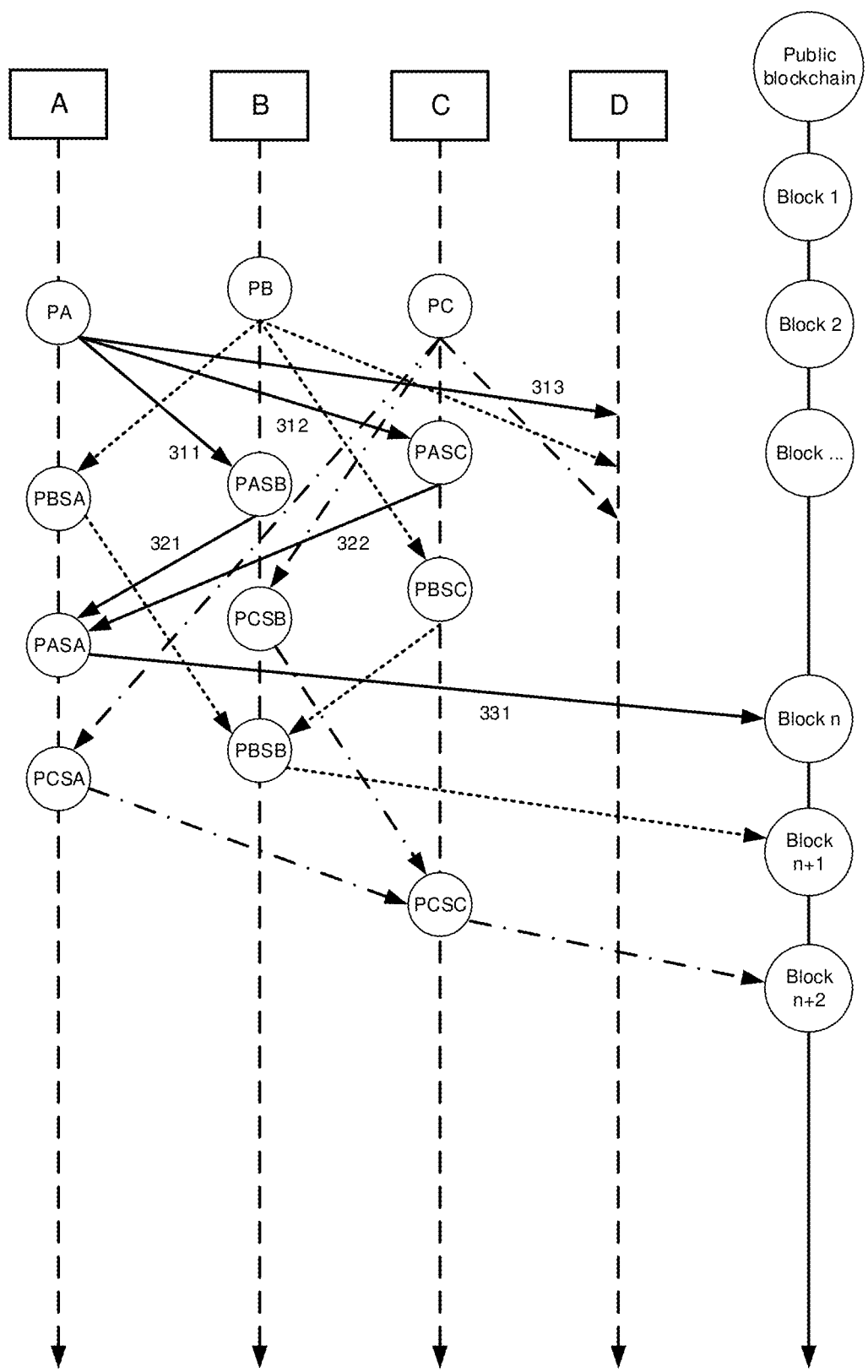
FIG. 3 illustrates a flowchart of a delivery method for implementing blockchain-based transactions, in accordance with some embodiments.

FIG. 3 illustrates a flowchart of a delivery method for implementing blockchain-based transactions, in accordance with some embodiments. The operations of the method presented below are intended to be illustrative. Depending on the implementation, the method may include additional, fewer, or alternative steps performed in various orders or in parallel.

In some embodiments, a private transaction may involve a number of parties. For example, one party may transfer a payment to one or more other parties. A party may be, but is not limited, a person, an entity, an account, or the like. A first party is one of the parties that is aware of the transaction information, which may include information of the sender (e.g., sender account address), receiver (e.g., receiver account address), and transaction amount. The first party can be a party that initiates the private transaction, a sender or receiver party to the private transaction, etc. Private transactions may need to hide one or more elements of the transaction information from non-participating parties.

Each party in the blockchain transactions may have one or more corresponding blockchain nodes to implement the blockchain transactions. In FIG. 3, A represents a first blockchain node, and B, C, and D represent second blockchain nodes. A may belong to a first party, and B, C, D may belong to second parties. PA represents a private transaction. In some embodiments, the first party may use an account that can be accessed from a device (e.g., a mobile phone, computer) to order the PA. The device may constitute a lightweight node or a full node. The second blockchain nodes described herein may represent a portion or all of the blockchain nodes to the PA other than the first blockchain node. For example, as shown in FIGS. 3, A, B, C, and D represent all of the blockchain nodes to the PA, in which A may transfer some assets to B, C, and D. Steps (e.g., message transmissions) with respect to the PA are represented by solid lines. Each private transaction may involve a number (N) of blockchain nodes. Since the PA involves, A, B, C, and D, N is four for the PA.

In some embodiments, A, B, C, and D may be pre-determined group members of a group associated with a group identification. The group assignment may be determined by an administrator or an alternative role and stored in a blockchain contract in a public blockchain. Among the group, A, B, C, and D may perform various private transactions. Similar to PA, PB represents another private transaction, and PC represents yet another private transaction. The PB and PC may both involve A, B, C, and D or some of them, and may be performed similarly as the PA. Steps with respect to the PB are represented by dot lines, and steps with respect to the PC are represented by dot-dash lines. The PA will be the main focus of the description below.

PXSY represents various signatures correspondingly certifying the private transactions. Here, "X" and "Y" can each be A, B, or C. A, B, and C may certify self-initiated private transactions and private transactions they have received. For example, "PASB" represents B's signature certifying the PA, and "PCSC" represents C's signature certifying the PC. In FIG. 3, D is non-functioning and thus does not send any message. In this specification, functioning means non-faulty and honest, and non-functioning means faulty and/or malicious. Possible faulty and/or malicious acts may include: failure to delivery message, message delivery delay, out-of-order message delivery, delivering arbitrary messages to different nodes, violating the protocol, etc.

Also shown in FIG. 3 are a public blockchain and its chain of blocks. The chain of blocks are arranged in a sequential manner, where a new block is added to the blockchain and linked to the latest existing block in the chain. The public blockchain is maintained by the blockchain nodes. Information stored in the public blockchain is accessible to all blockchain nodes of the public blockchain, which may include A, B, C, D, and some other blockchain nodes. For example, a transaction hash of the private transaction may be stored to the public blockchain and accessible to all blockchain nodes, so all blockchain nodes are aware of the private transaction. Transaction information of the private transaction (e.g., information of the sender, receiver, transaction amount in plaintext) may not be stored in the public blockchain and may be kept away from the other blockchain nodes not involved in the private transaction. Thus, the transaction information may only be known to the participating parties (e.g., blockchain nodes A, B, C, and D for the PA).

In some embodiments, A may transmit the PA to one or more second blockchain nodes of one or more second parties to the PA. The PA may comprise transaction information comprising one or more senders of the PA, one or more recipients of the PA, and one or more transaction amounts of the PA. For example, the transaction information of the PA may comprise A sending $5, B sending $1, C receiving $4, and D receiving $2. For another example, the transaction information of the PA may comprise A sending $2 each to B, C, and D. At step 311, A may transmit the PA (e.g., the corresponding transaction information) to B. At step 312, A may transmit the PA to C. At step 313, A may transmit the PA to D.

In some embodiments, the transmission for steps 311, 312, and 313 may be based on asymmetric key encryption or another encryption technique. For example, A may encrypt the PA respectively with B, C, and D's public keys, and correspondingly send the encrypted PA to B, C, and D. The public keys of A, B, C, and D may be publicly available. For example, the public keys may be stored in and accessible from the public blockchain.

In some embodiments, on receiving the PA, B and C may verify if the transaction information is correct. B and C may compute a representation (e.g., hash value) of the transaction information. The hash value may be referred to as a transaction hash. Additionally and optionally, the transmitted PA may further comprise a transaction hash known to A. For example, A may have computed the transaction hash and included the transaction hash in the transaction information. After receiving the transaction hash known to A, B and C may compare the self-computed hash value against the transaction hash known to A to verify. Either way, if the transaction information is verified, each of B and C may sign the transaction hash (e.g., by encrypting the transaction hash using its private key) and transmit the signature (e.g., the transaction hash encrypted using its private key) to A. As shown in FIG. 3, B transmits PASB to A at step 321, and C transmits PASC to A at step 322. The signature represents that the second party confirms the transaction information. A may also sign the transaction hash with its own signature to confirm the transaction information. Since D is non-functioning (e.g., being faulty or acting maliciously), D may not respond to the PA or transmit a false message.

In some embodiments, upon obtaining at least (N−F) signatures certifying the private transaction from one or more of the first and second blockchain nodes, A may perform step 331. For the PA, the number (N) of blockchain nodes (and associated parties) is four, and F is the largest integer no more than (N−1)/2. That is, F is an integer no more than 1.5, and "at least (N−F)" is effectively at least three. A may obtain PASB, PASC, and PASA (A's own signature certifying PA), thus obtaining the minimum requirement of three signatures. As described, the signature may comprise an encryption of the private transaction (e.g., encryption of the transaction information of the private transaction) with the corresponding first or second party's private key. The signature may certify a receipt of the PA and validity of the PA from the view of the corresponding party. In some embodiments, obtaining the at least (N−F) signatures comprises obtaining at least (N−F) consistent and valid signatures respectively from (N−F) distinct blockchain nodes of the N blockchain nodes. Consistency can be determined if decrypted signatures reveal the same transaction hash corresponding to the private transaction. Validity can be determined if the signature can be decrypted by the corresponding party's public key. For example, PASA, PASB, and PASC are the three consistent and valid signatures respectively from three distinct blockchain nodes. Even if D transmits a false message (e.g., an inconsistent PASD) to A, the three consistent and valid signatures can still be sufficient for A to perform step 331. Thus, the protocol can effectively tolerate up to F non-functioning blockchain nodes of parties to the private transaction involving N blockchain nodes of the parties.

At step 331, A may submit the PA for adding into the public blockchain. In some embodiments, A may transmit the PA to one or more blockchain nodes of the public blockchain for adding into the public blockchain, the PA comprising a transaction hash of the PA (e.g., a hash value of the transaction information), the at least (N−F) signatures, and the corresponding group identification. Since the transaction information is hashed, privacy protection of the transaction information is achieved. As shown in FIG. 3, the PA may be consensus verified and packed into block n of the public blockchain.

Similarly, the PB and PC may be performed and respectively packed into block n+1 and block n+2 of the public blockchain. In some embodiments, the order for storing the private transactions in the public transaction will determine the order for local executions of the private transactions. Block n precedes block n+1, which precedes block n+2. The PA will be locally executed first, followed up the PB, and then the PC. The order shown is merely an example. The PA, PB, and PC may be initiated by A, B, and C at any time points, and their order stored into the public blockchain may determine the order for local execution described with reference to FIG. 4. The order may also be relative to other private and public transactions stored into the public blockchain. For private and public transactions stored into the same block, there is also a sequential order, which will be used in their local execution order.

Figure 4:
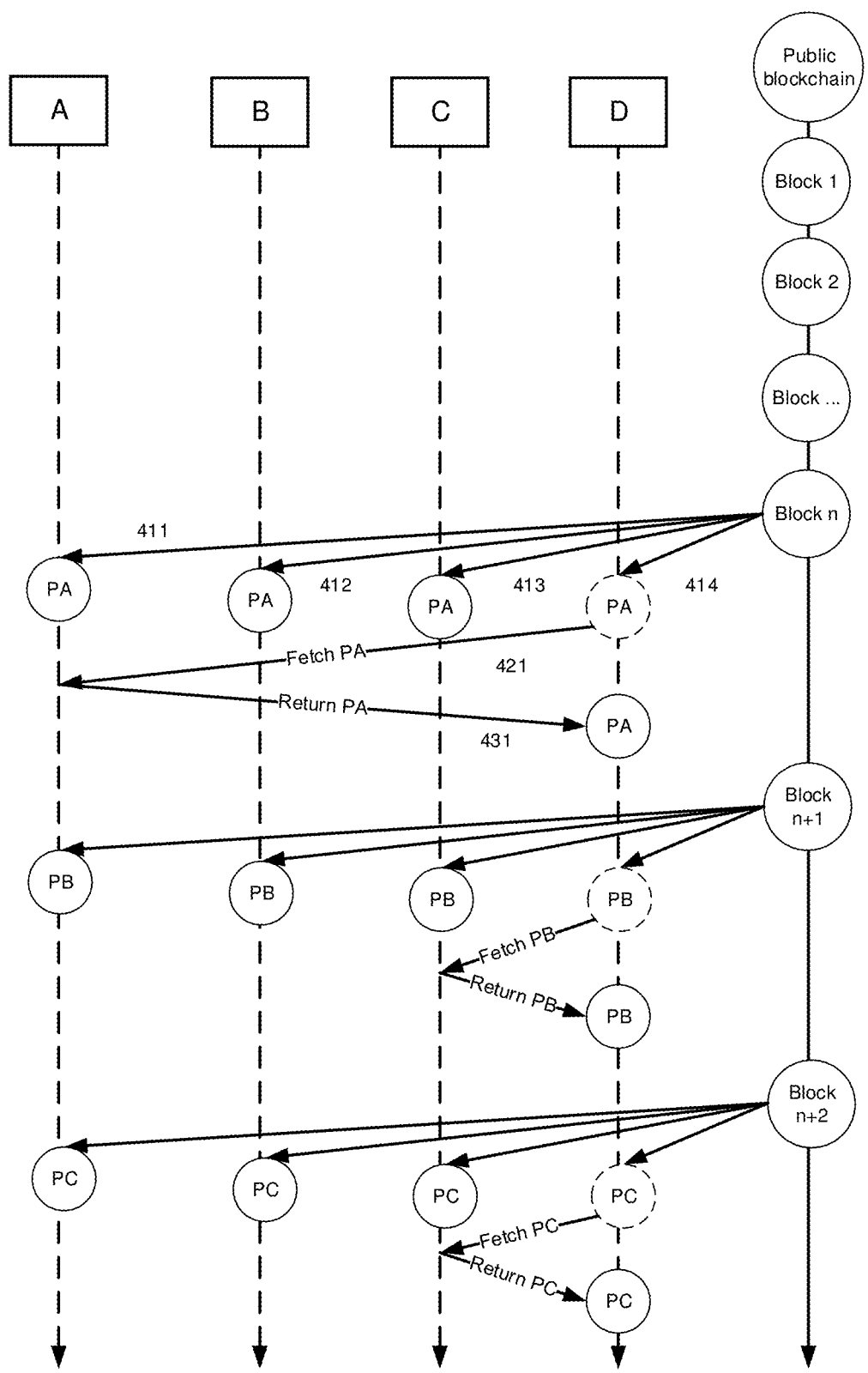
FIG. 4 illustrates a flowchart of a receiving method for implementing blockchain-based transactions, in accordance with some embodiments.

FIG. 4 illustrates a flowchart of a receiving method for implementing blockchain-based transactions, in accordance with some embodiments. The operations of the method presented below are intended to be illustrative. Depending on the implementation, the method may include additional, fewer, or alternative steps performed in various orders or in parallel. Blocks and symbols used in FIG. 4 follow those in FIG. 3. Additionally, a dash line circle "PX" indicates that D does not have the transaction information for the corresponding private transaction, where here "X" can be A, B, or C.

In some embodiments, each blockchain node of the public blockchain may synchronize to the public blockchain periodically to update the local copy of the public blockchain. When block n is synchronized, each blockchain node may become aware of the PA (PA's transaction hash and signatures). Of all the blockchain nodes, each of A, B, C, and D may become aware that the PA involves itself, because the PA's corresponding group identification (which is also stored to the public blockchain with the PA) points to the group that it belongs to. Accordingly, A, B, C, and D may verify the PA by (1) verifying if a number of signatures comprised in the PA stored in the public blockchain reaches at least (N−F), and/or (2) verifying if the transaction hash stored in the public blockchain is consistent with the self-computed hash value of the transaction information. For example, A, B, C, and D as the blockchain nodes of the parties to the PA may perform the verification.

In some embodiments, on successful verification of the PA, A, B, and C may determine that transaction information of the PA is locally stored, and thus locally execute the PA according to an order of the PA stored in the public blockchain relative to other private and public transactions stored in the public blockchain, such as PB and PC. A, B, and C may perform the local execution and thus update their local databases (e.g., account balances) based on the transaction information of the PA. The local databases may be kept secret from the public. In one embodiment, blocks in the public blockchain may be ordered by, for example, block 1, block 2, . . . , block n. Public and private transactions stored in each block may also be ordered by, for example, transaction 1, transaction 2, . . . , transaction n. According to the order, a public or private transaction in a lower block (e.g., PA) may be executed before that in a higher block (e.g., PB), and a public or private transaction with a smaller transaction number may be executed before that with a larger transaction number in the same block.

In some embodiments, D may not have locally stored the transaction information of PA. For example, D might experience a down time and have missed the transmission of the private transaction when the A broadcast the PA in FIG. 3. Thus, upon knowing its involvement in PA, at step 421, D may send a synchronization request to A, B, and/or C. A, B, or C may receive the synchronization request from D and determine if D is associated with a party to the PA. In response to determining that D is associated with a party to the PA, at step 431, A, B, or C may transmit the PA (e.g., the transaction information of the PA) to D. D can make sure that it receives a true copy of the transaction information by computing a hash value of the transaction information and comparing the computed hash value against the transaction hash of the PA stored in the public blockchain. Then, D may locally execute the PA. Afterwards, D may similarly obtain and execute the PB and then the PC. D may obtain PB and PC from A, B, and/or C.

In some embodiments, the delivery method described in FIG. 3 and the receiving method described in FIG. 4 follow an atomic broadcast. As shown, the private transaction delivery and receiving protocols may satisfy atomic broadcast protocols which have the following properties: uniform agreement (if one correct participant receives a message, then all correct participants will eventually receive that message), validity (if a correct participant broadcasts a message, then all correct participants will eventually receive it), uniform total order (the messages are totally ordered in the mathematical sense; that is, if any correct participant receives message 1 first and message 2 next, then every other correct participant must receive message 1 before message 2), and uniform integrity (a message is received by each participant at most once, and only if it was previously broadcast). In some embodiments, for fault-tolerant distributed computing, an atomic broadcast or total order broadcast is a broadcast where all correct processes in a system of multiple processes receive the same set of messages in the same order; that is, the same sequence of messages. The broadcast is termed "atomic" because it either eventually completes correctly at all participants, or all participants abort without side effects.

In one embodiment, uniform agreement may indicate that if a functioning blockchain node (to a private transaction) receives a message, then all functioning blockchain nodes (to the private transaction) will eventually receive that message. In another embodiment, validity may indicate that if a functioning blockchain node (in association with a party to a private transaction) broadcasts a message, then all functioning blockchain node(s) (in association with other part(ies) to the private transaction) will eventually receive the message. In some embodiments, the private transaction may be stored in a public blockchain, if a threshold number (N−F) of consistent and valid signatures from distinct blockchain nodes (associated with parties) to the private transaction are obtained, where a total of N blockchain nodes (associated with N parties) are involved in the private transaction, and F is an integer no more than (N−1)/2, which implies that N is no less than (2F+1). Thus, at least (N−F)

blockchain nodes have received the private transaction before the private transaction is added to the public blockchain. The rest F blockchain nodes can be notified of the private transaction by synchronizing to the public blockchain, and obtain the information of the private transaction by requesting from the (N−F) blockchain nodes, thus achieving uniform agreement. Even if up to F of the (N−F) blockchain nodes are non-functioning (e.g., malicious or faulty), at least one of the (N−F) blockchain nodes is functioning, because N is no less than (2F+1) and thus (N−2F) is no less than one. The at least one functioning blockchain node can transmit the transaction information to the other blockchain nodes to the private transaction, thus achieving validity.

In yet another embodiment, uniform total order may indicate that the messages are totally ordered, and if a functioning blockchain node (to a private transaction) receives message 1 first and message 2 second, then another functioning blockchain node (to the private transaction) receives message 1 before message 2. To achieve uniform total order, a representation (e.g., transaction hash) of the private transaction may be stored to the public blockchain, thus gaining an order relative to other private and/or public transactions. The blockchain nodes involved in the private transaction can execute the private transaction according to the same order stored in the public blockchain.

FIG. 5 illustrates a flowchart of an exemplary method 510 for implementing blockchain-based private transactions, according to some embodiments of this specification. The method 510 may be implemented by one or more components of the system 100 of FIG. 1 (e.g., Node 1, Node 2, . . . , or Node i described above or a similar device, or a combination of any of the nodes and one or more additional devices such as Node A). The method 510 may be implemented by a system or device (e.g., computer, server) comprising various hardware machine and/or software. For example, the system or device may comprise one or more processors and one or more non-transitory computer-readable storage media (e.g., one or more memories) coupled to the one or more processors and configured with instructions executable by the one or more processors to cause the system or device (e.g., the processor) to perform the method 510. The operations of method 510 presented below are intended to be illustrative. Depending on the implementation, the method 510 may include additional, fewer, or alternative steps performed in various orders or in parallel. Further details of the method 510 can be referred to FIG. 1 to FIG. 4 and related descriptions above.

In some embodiments, the method 510 is a method for implementing blockchain-based private transactions. The method 510 is an atomic broadcast described herein. The method 510 may be performed by a first blockchain node (e.g., a first blockchain node of a first party) to a private transaction between/among a number (N) of blockchain nodes. The private transaction also involves one or more second blockchain nodes (e.g., second blockchain nodes of second parties). In some embodiments, the private transaction may involve only the first blockchain node and the one or more blockchain nodes. When a step is described as performed by the first or second party, a person of ordinary skill in the art will understand that the step may be performed by a blockchain node associated with the corresponding party. The first party and the second party may belong to the same entity or different entities. The first and the second blockchain nodes may belong to the same party or different parties. The first or second party may be a party that initiates the transaction, a sender or receiver party to the transaction, etc. In some embodiments, the party may be a sender and/or a receiver (of an asset, a token, etc.) to the private transaction. That is, for the private transaction, a party may send something to and/or receive something from another party to the private transaction. Notwithstanding, a party may be an observer and does not send and/or receive anything from the private transaction.

Block 511 includes transmitting, at a first blockchain node of a number (N) of blockchain nodes that are involved in a private transaction, the private transaction to each of a plurality of second blockchain nodes of the N blockchain nodes, wherein N is at least four. The second blockchain nodes may refer to second parties to the private transaction. In some embodiments, the private transaction comprises transaction information comprising one or more senders of the private transaction, one or more recipients of the private transaction, and one or more transaction amounts of the private transaction. The first blockchain node and second blockchain node may be the same blockchain node or different blockchain nodes. In some embodiments, the first blockchain node may represent a first entity (e.g., a first financial institution), and the second blockchain node may represent a second entity (e.g., a second financial institution). In some embodiments, any of the N blockchain nodes involved in the transaction may or may not directly participate in the underlying private transaction. Direct participation may be, for example, acting as a sender or recipient of a transaction amount. Indirect participation may be, for example, acting as an observer, a regulator, or a verifier who does not receive or send any amount. An indirect participator may alternatively be a party that sends a token amount. For example, in a private transaction, A sends 1 million dollars to B, C sends 1 dollar to D, and D sends 1 dollar to C. Here, A and B are direct participators, and C and D are indirect participators. The involvement of indirect participators may improve privacy protection by burying the direct participators, since the transaction amounts are protected.

In some embodiments, transmitting the private transaction to each of the plurality of second blockchain nodes comprises: respectively encrypting the private transaction (e.g., transaction information of the private transaction) with one or more public keys (of one or more second parties) respectively associated with the one or more second blockchain nodes; and respectively transmitting the encrypted private transactions to the one or more second blockchain nodes.

Block 512 includes obtaining, at the first blockchain node, at least (N−F) signatures certifying the private transaction respectively from at least (N−F) blockchain nodes of the first and second blockchain nodes, wherein F is the largest integer no more than (N−1)/2. In some embodiments, the signature comprises an encryption of the private transaction (e.g., transaction information of the private transaction) with a private key corresponding to the first or second blockchain node. For example, the signature comprises an encryption of the private transaction with a corresponding first or second party's private key, wherein the first or second party is correspondingly associated with the first or second blockchain node. In one embodiment, certifying the private transaction comprises certifying receipt of the private transaction and validity of the private transaction.

In some embodiments, obtaining the at least (N−F) signatures comprises obtaining at least (N−F) consistent and valid signatures respectively from (N−F) distinct blockchain nodes of the N blockchain nodes. In one embodiment, one of the (N−F) signatures is from the first blockchain node, and the other (N−F−1) signatures are respectively from the plurality of second blockchain nodes. Thus, the number of second blockchain nodes may be (N−F−1) or more, but no more than (N−1).

Block 513 includes submitting, at the first blockchain node, a hash value of the private transaction in association with the at least (N−F) signatures to one or more blockchain nodes of a public blockchain for adding into the public blockchain. The one or more blockchain nodes of the public blockchain may or may not include the first and second blockchain nodes. In some embodiments, submitting the hash value of the private transaction in association with the at least (N−F) signatures to the one or more blockchain nodes of the public blockchain for adding into the public blockchain comprises transmitting a blockchain transaction comprising (1) a transaction hash of the private transaction (e.g., a hash value of the transaction information), (2) the at least (N−F) signatures, and (3) a group identification of a group comprising the N blockchain nodes to the private transaction to one or more blockchain nodes of a public blockchain for adding into the public blockchain. The group identification, when stored into the public blockchain, serves as a notification to the N blockchain nodes of a successful consensus verification of the private transaction. Any of the N blockchain nodes unaware of the private transaction can be notified by synchronizing to the public blockchain and finding out about a transaction recorded in the blockchain in association with the group identification.

In some embodiments, the method further comprises obtaining, at the first blockchain node, the private transaction from the public blockchain; and verifying the private transaction by verifying if a number of signatures comprised in the obtained private transaction reaches at least (N−F). The blockchain nodes of the various parties to the private transaction may perform the verification.

In some embodiments, the method further comprises locally executing the private transaction according to an order of the private transaction stored in the public blockchain relative to other private and public transactions stored in the public blockchain. The blockchain nodes of the various parties to the private transaction may perform the local execution and thus update their local databases (e.g., account balances) based on transaction information of the private transaction.

In some embodiments, the method further comprises: receiving a synchronization request from a requesting blockchain node; determining if the requesting blockchain node is one of the N blockchain nodes; and in response to determining that the requesting blockchain node is one of the N blockchain nodes, transmitting the private transaction (e.g., transaction information of the private transaction) to the requesting blockchain node via a non-blockchain channel In one embodiment, the requesting blockchain node is one of F non-functioning blockchain node(s) of the N blockchain nodes. For example, the requesting blockchain node may be not one of the plurality of second blockchain nodes; or may be one of the plurality of second blockchain nodes, but have missed the transmission of the private transaction when the first blockchain node broadcast the private transaction. Here, the requesting blockchain node may realize missing the private transaction by finding its involvement in the private transaction according to the public blockchain (e.g., the requesting blockchain node synchronizes to the public blockchain and detects a new transaction corresponding to the group identification of the N blockchain nodes. Since it is in the group, the requesting blockchain node may realize that a transaction has been consensus verified but it is not aware of), and thus request to obtain the private transaction from other blockchain nodes involved in the private transaction. The first blockchain node may directly transmit details of the private transaction to the requesting blockchain node via a communication channel outside the blockchain. The details may not be available from the blockchain, since the transaction stored in the blockchain may merely comprise a transaction hash of the transaction (e.g., a hash value of the transaction information), the at least (N−F) signatures, and the corresponding group identification, and the details are not obtainable from the transaction hash.

In some embodiments, a computer-implemented method for atomic broadcast may include the following steps: transmitting, by a first blockchain computer node of a number (N) of blockchain computer nodes of a blockchain, data to each of a plurality of second blockchain computer nodes of the N blockchain computer nodes (e.g., via a non-blockchain computer network channel, the use of the non-blockchain computer network channel protecting security and privacy of the data), wherein N is at least four; obtaining, by the first blockchain computer node, at least (N−F) signatures certifying the data respectively (e.g., via the non-blockchain computer network channel, wherein the at least (N−F) signatures respectively correspond to at least (N−F) blockchain computer nodes among the first and second blockchain computer nodes, wherein F is the largest integer that is not greater than (N−1)/2; generating, by the first blockchain computer node, a hash value of the data; associating, by the first blockchain computer node, the hash value with the at least (N−F) signatures; and submitting, by the first blockchain computer node, the hash value and the at least (N−F) signatures in association with each other to one or more blockchain computer nodes of the blockchain (e.g., via a blockchain computer network channel) for adding into the blockchain based on a consensus verification, by the blockchain computer nodes, of the hash value and the at least (N−F) signatures.

In some embodiments, transmitting the data to each of the plurality of second blockchain computer nodes comprises: encrypting the data with a plurality of public keys respectively corresponding to the plurality of second blockchain computer nodes to obtain a plurality of pieces of encrypted data; and transmitting the plurality of pieces of encrypted data to the plurality of second blockchain computer nodes, respectively. By this encryption, the encrypted data may only be decrypted by the corresponding second blockchain computer node.

In some embodiments, the at least (N−F) signatures certifying the data comprises: (N−F) signatures certifying receipt of the data and validity of the data. That is, the signature is generated if the data is received and verified to be valid.

In some embodiments, each of the (N−F) signatures comprises an encryption of the data with a private key corresponding to one of the at least (N−F) blockchain computer nodes. For example, the corresponding blockchain computer node may generate the signature by encrypting the data with its private key.

In some embodiments, obtaining the at least (N−F) signatures comprises: obtaining at least (N−F) consistent and valid signatures respectively from (N−F) distinct blockchain computer nodes of the N blockchain computer nodes. To be consistent, the signatures are consistent with each other (e.g., signing against the same data). To be valid, each of the signatures has to be signed by the intended blockchain computer node (e.g., by its private key).

In some embodiments, the at least (N−F) signatures are respectively obtained from the plurality of second blockchain computer nodes. In some other embodiments, one of the at least (N−F) signatures is obtained from the first blockchain computer node; and the other at least (N−F−1) signatures are respectively obtained from the plurality of second blockchain computer nodes. That is, the first blockchain computer node may generate a signature on its own, which counts towards the at least (N−F) signatures.

In some embodiments, submitting the hash value and the at least (N−F) signatures to the one or more blockchain computer nodes of the blockchain comprises: generating a blockchain transaction comprising the hash value and the at least (N−F) signatures; and transmitting the blockchain transaction to the one or more blockchain computer nodes of the blockchain for adding into the blockchain.

In some embodiments, the generated blockchain transaction further comprises a group identification corresponding to the N blockchain computer nodes; and the group identification, when stored into the blockchain, identifies the N blockchain computer nodes. For example, when the generated blockchain transaction is stored to the blockchain through consensus verification, the group identification included in the blockchain transaction is stored to the blockchain. Thus, the N blockchain computer nodes which know that they belong the group of the group identification, when querying the blockchain, would find the group identification associated with the hash value and the at least (N−F) signatures. These N blockchain computer nodes are identified as associated with the data (e.g., a private transaction described above) and their query serves as a notification to the N blockchain computer nodes.

In some embodiments, the method further comprises: obtaining, by the first blockchain computer node, the blockchain transaction from the blockchain; and verifying, by the first blockchain computer node, the data by verifying if a number of signatures comprised in the obtained blockchain transaction reaches (N−F).

In some embodiments, the method further comprises: locally executing, by the first blockchain computer node, the data (e.g., the private transaction) according to an order of the blockchain transaction stored in the blockchain relative to other blockchain transactions stored in the blockchain. In some embodiments, the blockchain is a public blockchain; and the data comprises one or more identifications of one or more senders of a private transaction, one or more identifications of one or more recipients of the private transaction, and one or more transaction amounts of the private transaction.

In some embodiments, the method further comprises: receiving, by the first blockchain computer node, a synchronization request from a requesting blockchain computer node; determining, by the first blockchain computer node, if the requesting blockchain computer node is one of the N blockchain computer nodes; and in response to determining that the requesting blockchain computer node is one of the N blockchain computer nodes, transmitting, by the first blockchain computer node, the data to the requesting blockchain computer node via the non-blockchain computer network channel. The use of the non-blockchain computer network channel protects the security and privacy of the data. In some embodiments, the requesting blockchain computer node is one of F non-functioning blockchain computer nodes of the N blockchain computer nodes.

Figure 6:
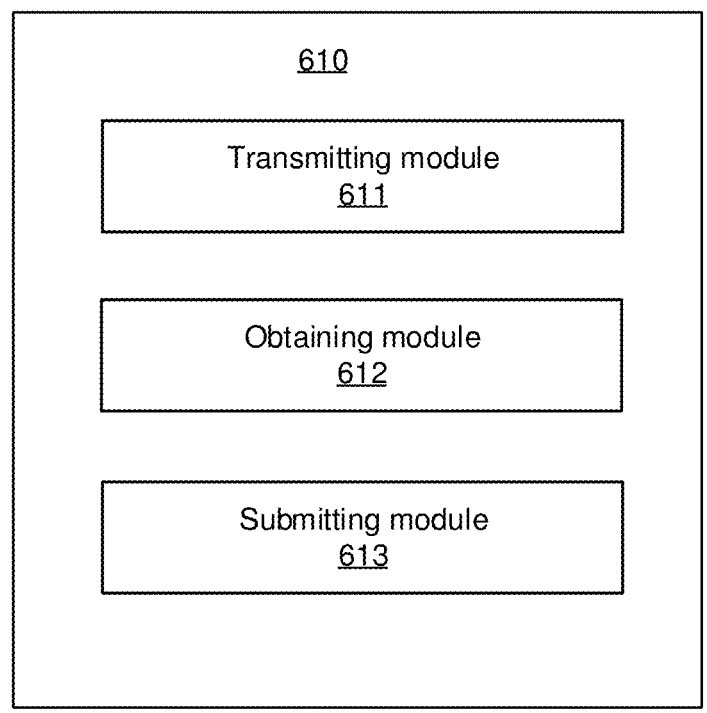
FIG. 6 illustrates a block diagram of an apparatus for implementing blockchain-based private transactions, in accordance with some embodiments.

FIG. 6 illustrates a block diagram of a system 610 for implementing blockchain-based private transactions, in accordance with some embodiments. The system 610 (e.g., a computer system) may be an example of an implementation of Node 1, Node 2, Node 3, . . . , or Node i described above or a similar device, or a combination of any of the nodes and an additional device (e.g., Node A). For example, the method 510 may be implemented by the system 610. The system 610 may comprise one or more processors and one or more non-transitory computer-readable storage media (e.g., one or more memories) coupled to the one or more processors and configured with instructions executable by the one or more processors to cause the system or device (e.g., the processor) to perform the methods and operations described above, e.g., the method 510. The system 610 may comprise various units/modules corresponding to the instructions (e.g., software instructions).

In some embodiments, the system 610 may be referred to as an apparatus for implementing blockchain-based private transactions. The apparatus may correspond to a first blockchain node to a private transaction between/among a number (N) of blockchain nodes. The apparatus may comprise a transmitting module 611 for transmitting the private transaction to each of a plurality of second blockchain nodes of the N blockchain nodes, wherein N is at least four; an obtaining module 612 for obtaining at least (N−F) signatures certifying the private transaction respectively from at least (N−F) blockchain nodes of the first and second blockchain nodes, wherein F is a largest integer no more than (N−1)/2; and a submitting module 613 for submitting a hash value of the private transaction in association with the at least (N−F) signatures to one or more blockchain nodes of a public blockchain for adding into the public blockchain.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 7:
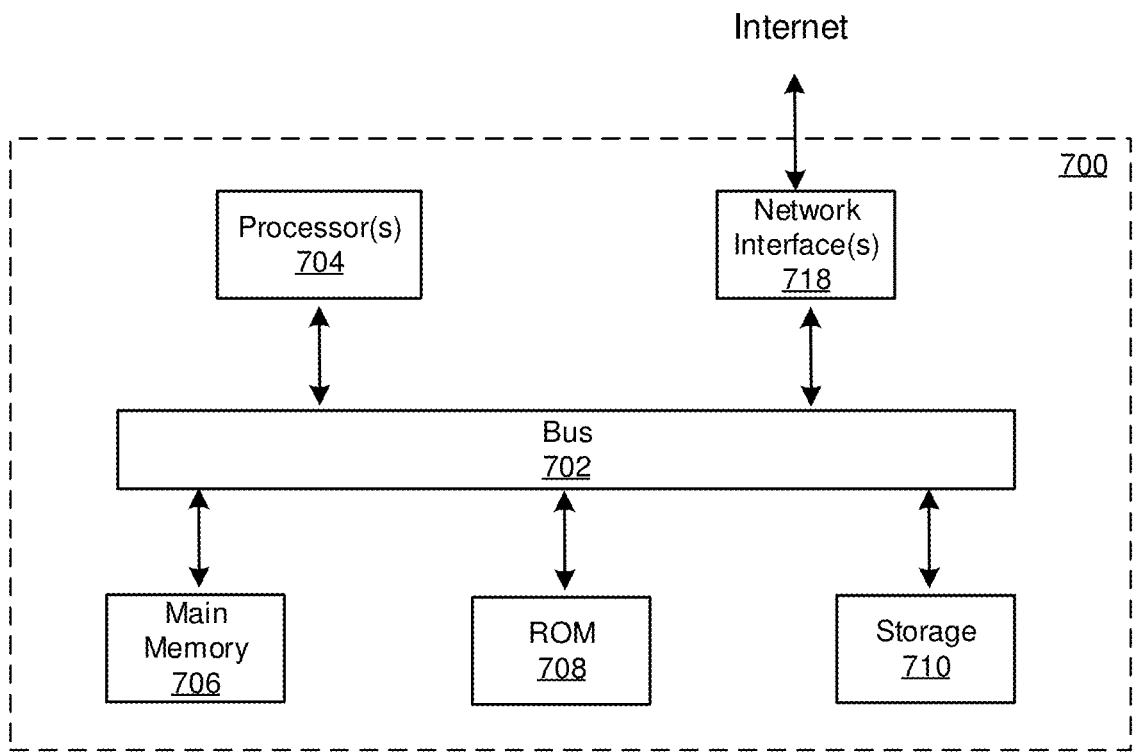
FIG. 7 illustrates a block diagram of a computer system in which any of the embodiments described herein may be implemented.

FIG. 7 is a block diagram that illustrates a computer system 700 upon which any of the embodiments described herein may be implemented. The system 700 may perform any of the methods described herein (e.g., the method 510 for implementing blockchain-based private transactions). The system 700 may be implemented in any of the systems described herein (e.g., the system 610 for implementing blockchain-based private transactions). The system 700 may be implemented in any of the nodes described herein and configured to perform corresponding steps for implementing blockchain contracts. The computer system 700 includes a bus 702 or other communication mechanism for communicating information, one or more hardware processor(s) 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions executable by processor(s) 704. Main memory 706 also may be used for storing temporary variables or other intermediate information during execution of instructions executable by processor(s) 704. Such instructions, when stored in storage media accessible to processor(s) 704, render computer system 700 into a special-purpose machine that is customized to perform the operations specified in the instructions. The computer system 700 further includes a read only memory (ROM) 708 or other static storage device coupled to bus 702 for storing static information and instructions for processor(s) 704. A storage device 710, such as a magnetic disk, optical disk, or USB thumb drive (Flash drive), etc., is provided and coupled to bus 702 for storing information and instructions.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the operations, methods, and processes described herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The main memory 706, the ROM 708, and/or the storage device 710 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 also includes a network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicate with a WAN). Wireless links may also be implemented. In any such implementation, network interface 718 sends and receives electrical, electromagnetic or optical signals that carry digital data streams representing various types of information.

The computer system 700 can send messages and receive data, including program code, through the network(s), network link and network interface 718. In the Internet example, a server might transmit a requested code for an application program through the Internet, the ISP, the local network and the network interface 718.

The received code may be executed by processor(s) 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

Although an overview of the subject matter has been described with reference to specific embodiments, various modifications and changes may be made to these embodiments without departing from the broader scope of embodiments of the this specification. The Detailed Description should not to be taken in a limiting sense, and the scope of various embodiments is defined only by the appended claims, along with the full range of equivalents to which such claims are entitled.

The invention claimed is:

1. A computer-implemented method for atomic broadcast, the method comprising:
    transmitting, by a first blockchain computer node of a number (N) of blockchain computer nodes of a blockchain, data to each of a plurality of second blockchain computer nodes of the N blockchain computer nodes, wherein N is at least four;
    obtaining, by the first blockchain computer node, at least (N−F) signatures certifying the data respectively, wherein the at least (N−F) signatures respectively correspond to at least (N−F) blockchain computer nodes among the first and second blockchain computer nodes, wherein F is a largest integer that is not greater than (N−1)/2;
    generating, by the first blockchain computer node, a hash value of the data;
    associating, by the first blockchain computer node, the hash value with the at least (N−F) signatures;
    generating, by the first blockchain computer node, a blockchain transaction comprising the hash value, the at least (N−F) signatures, and a group identification corresponding to the N blockchain computer nodes; and
    submitting, by the first blockchain computer node, the generated blockchain transaction to one or more blockchain computer nodes of the blockchain for adding into the blockchain based on a consensus verification of the generated blockchain transaction, wherein the group identification, when stored into the blockchain, identifies the N blockchain computer nodes.

2. The method of claim 1, wherein transmitting the data to each of the plurality of second blockchain computer nodes comprises:
    encrypting the data with a plurality of public keys respectively corresponding to the plurality of second blockchain computer nodes to obtain a plurality of pieces of encrypted data; and
    transmitting the plurality of pieces of encrypted data to the plurality of second blockchain computer nodes, respectively.

3. The method of claim 1, wherein the at least (N−F) signatures certifying the data comprises:
    (N−F) signatures certifying receipt of the data and validity of the data.

4. The method of claim 1, wherein each of the (N−F) signatures comprises:
    an encryption of the data with a private key corresponding to one of the at least (N−F) blockchain computer nodes.

5. The method of claim 1, wherein obtaining the at least (N−F) signatures comprises:
    obtaining at least (N−F) consistent and valid signatures respectively from (N−F) distinct blockchain computer nodes of the N blockchain computer nodes.

6. The method of claim 1, wherein:
    the at least (N−F) signatures are respectively obtained from the plurality of second blockchain computer nodes.

7. The method of claim 1, wherein:
    one of the at least (N−F) signatures is obtained from the first blockchain computer node; and
    the other at least (N−F−1) signatures are respectively obtained from the plurality of second blockchain computer nodes.

8. The method of claim 1, further comprising:
    obtaining, by the first blockchain computer node, the blockchain transaction from the blockchain; and
    verifying, by the first blockchain computer node, the data by verifying if a number of signatures comprised in the obtained blockchain transaction reaches (N−F).

9. The method of claim 1, further comprising:
    locally executing, by the first blockchain computer node, the data according to an order of the blockchain transaction stored in the blockchain relative to other blockchain transactions stored in the blockchain.

10. The method of claim 9, further comprising:
    receiving, by the first blockchain computer node, a synchronization request from a requesting blockchain computer node;
    determining, by the first blockchain computer node, if the requesting blockchain computer node is one of the N blockchain computer nodes; and
    in response to determining that the requesting blockchain computer node is one of the N blockchain computer nodes, transmitting, by the first blockchain computer node, the data to the requesting blockchain computer node via a non-blockchain computer network channel.

11. The method of claim 10, wherein:
    the requesting blockchain computer node is one of F non-functioning blockchain computer nodes of the N blockchain computer nodes.

12. The method of claim 1, wherein:
    the blockchain is a public blockchain; and
    the data comprises one or more identifications of one or more senders of a private transaction, one or more identifications of one or more recipients of the private transaction, and one or more transaction amounts of the private transaction.

13. A non-transitory computer-readable storage medium of a first blockchain computer node, the non-transitory computer-readable storage medium storing instructions that, when executed by a processor, cause the processor to perform operations comprising:

transmitting data to each of a plurality of second blockchain computer nodes of a number (N) of blockchain computer nodes of a blockchain, wherein N is at least four;

obtaining at least (N−F) signatures certifying the data respectively, wherein the at least (N−F) signatures respectively correspond to at least (N−F) blockchain computer nodes among the first and second blockchain computer nodes, wherein F is a largest integer that is not greater than (N−1)/2;

generating a hash value of the data;

associating the hash value with the at least (N−F) signatures;

submitting the hash value and the at least (N−F) signatures in association with each other to one or more blockchain computer nodes of the blockchain for adding into the blockchain based on a consensus verification of the hash value and the at least (N−F) signatures;

locally executing the data according to an order of the blockchain transaction stored in the blockchain relative to other blockchain transactions stored in the blockchain;

receiving a synchronization request from a requesting blockchain computer node;

determining if the requesting blockchain computer node is one of the N blockchain computer nodes; and in response to determining that the requesting blockchain computer node is one of the N blockchain computer nodes, transmitting the data to the requesting blockchain computer node via a non-blockchain computer network channel.

14. The non-transitory computer-readable storage medium of claim 13, wherein submitting the hash value and the at least (N−F) signatures to the one or more blockchain computer nodes of the blockchain comprises:

generating a blockchain transaction comprising the hash value and the at least (N−F) signatures; and transmitting the blockchain transaction to the one or more blockchain computer nodes of the blockchain for adding into the blockchain.

15. The non-transitory computer-readable storage medium of claim 14, wherein the operations further comprise:

obtaining the blockchain transaction from the blockchain; and verifying the data by verifying if a number of signatures comprised in the obtained blockchain transaction reaches (N−F).

16. A system acting as a first blockchain computer node, the system comprising one or more processors and one or more memories configured with instructions that, when executed by the one or more processors, cause the system to perform operations comprising:

transmitting data to each of a plurality of second blockchain computer nodes of a number (N) of blockchain computer nodes of a blockchain, wherein N is at least four;

obtaining at least (N−F) signatures certifying the data respectively, wherein the at least (N−F) signatures respectively correspond to at least (N−F) blockchain computer nodes among the first and second blockchain computer nodes, wherein F is a largest integer that is not greater than (N−1)/2;

generating a hash value of the data;

associating the hash value with the at least (N−F) signatures;

generating a blockchain transaction comprising the hash value, the at least (N−F) signatures, and a group identification corresponding to the N blockchain computer nodes; and submitting the generated blockchain transaction to one or more blockchain computer nodes of the blockchain for adding into the blockchain based on a consensus verification of the generated blockchain transaction, wherein the group identification, when stored into the blockchain, identifies the N blockchain computer nodes.

\* \* \* \* \*